No. 648,466. Patented May 1, 1900.
C. S. NASH.
POTATO HARVESTER.
(Application filed June 20, 1899.)
(No Model.) 3 Sheets—Sheet 1.
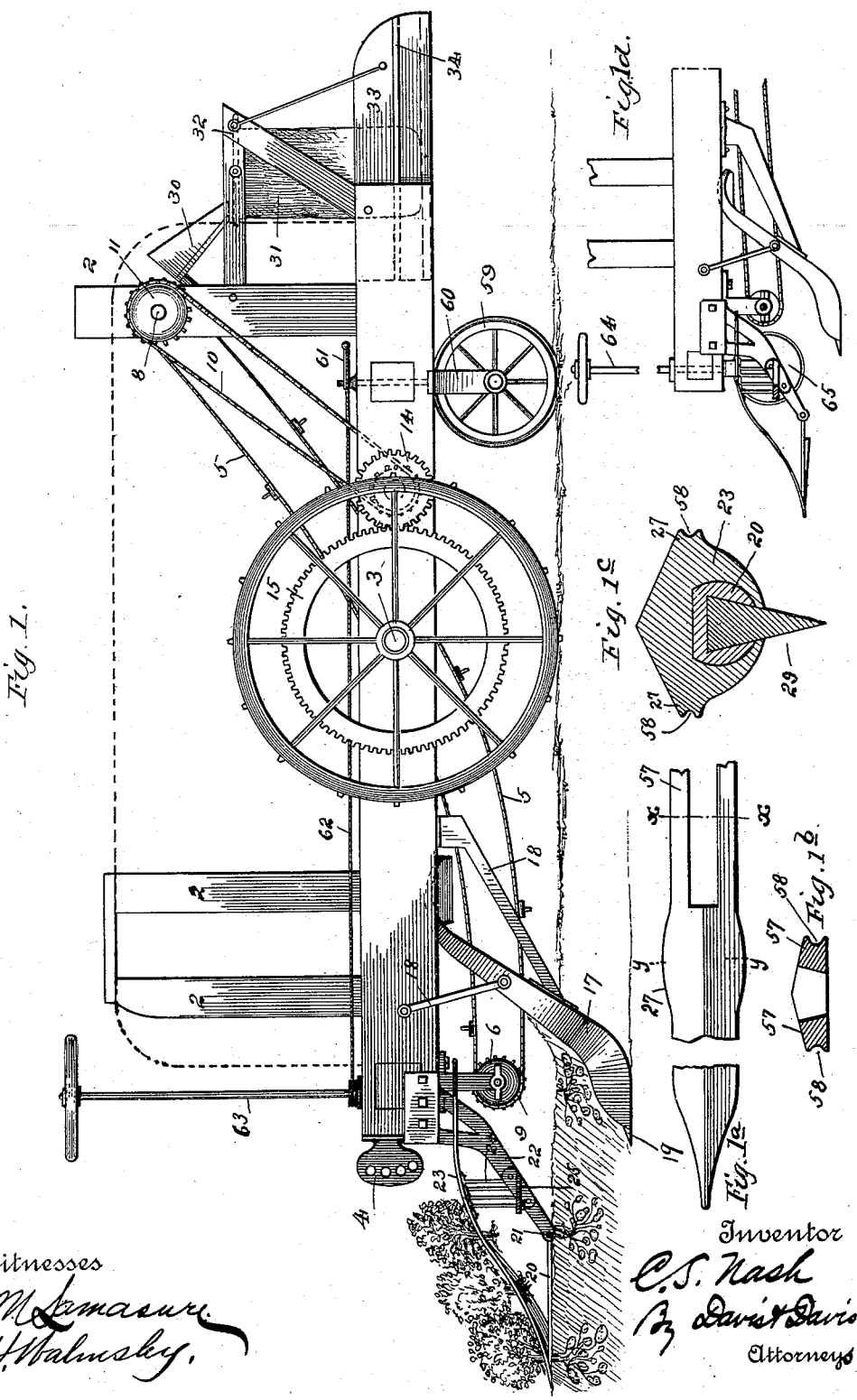
Witnesses
G. M. Lamasure
G. H. Walmsley
Inventor
C. S. Nash
By Davis & Davis
Attorneys No. 648,466. Patented May 1, 1900.
C. S. NASH.
POTATO HARVESTER.
(Application filed June 20, 1899.)
(No Model.) 3 Sheets—Sheet 2.
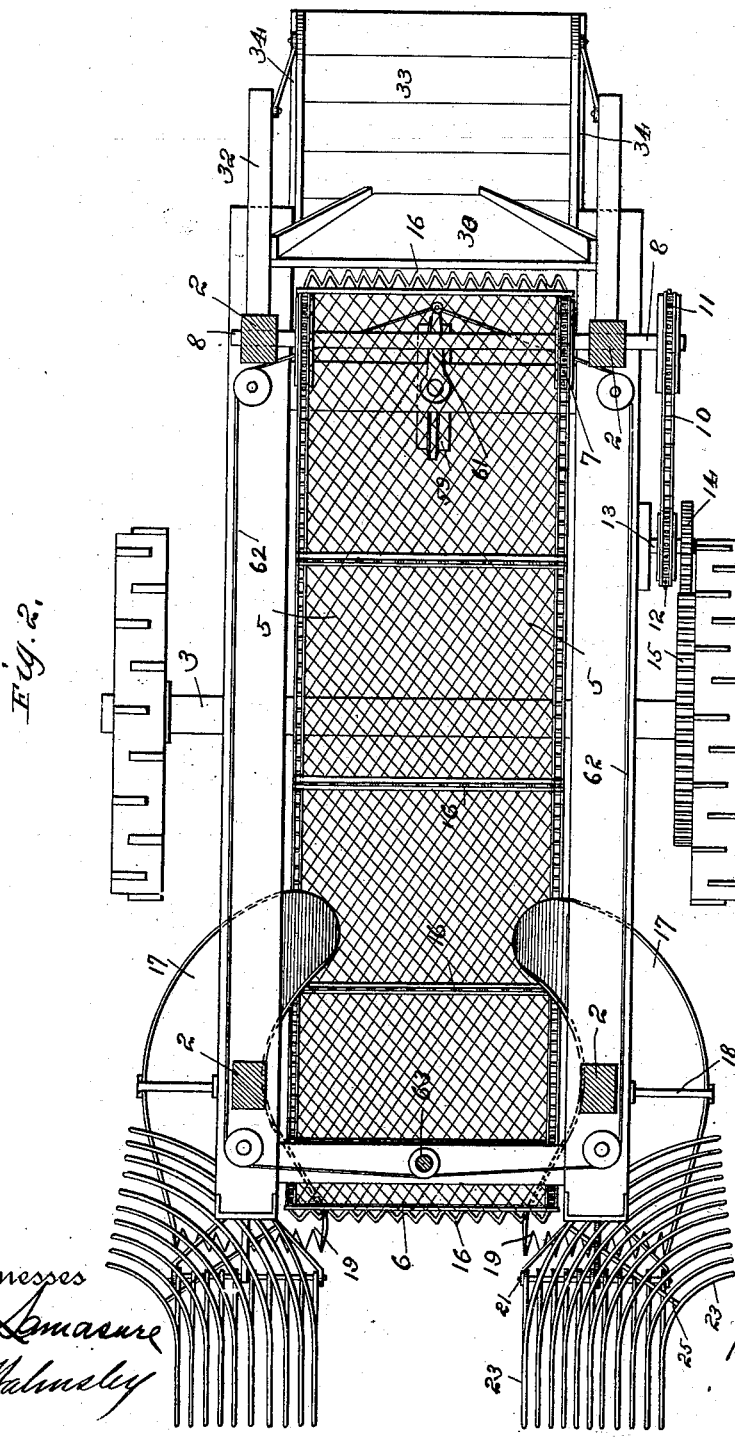

No. 648,466. Patented May 1, 1900.
C. S. NASH.
POTATO HARVESTER.
(Application filed June 20, 1899.)
(No Model.) 3 Sheets—Sheet 3.
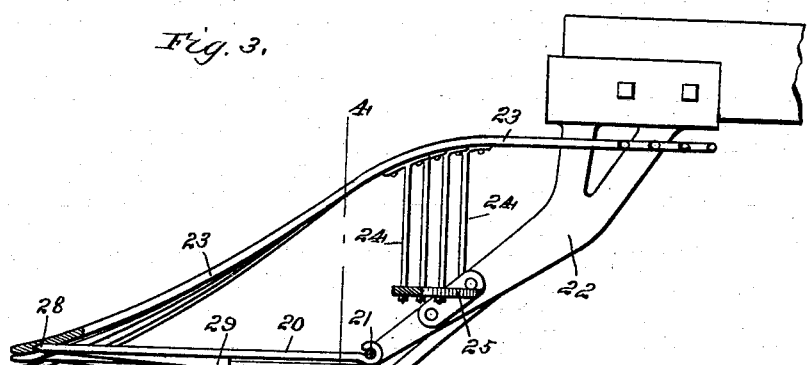
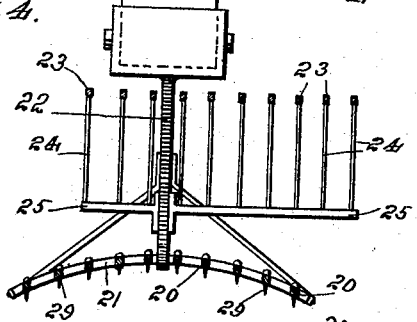
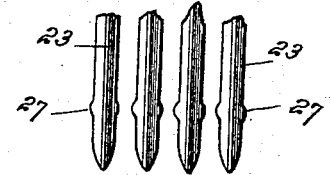
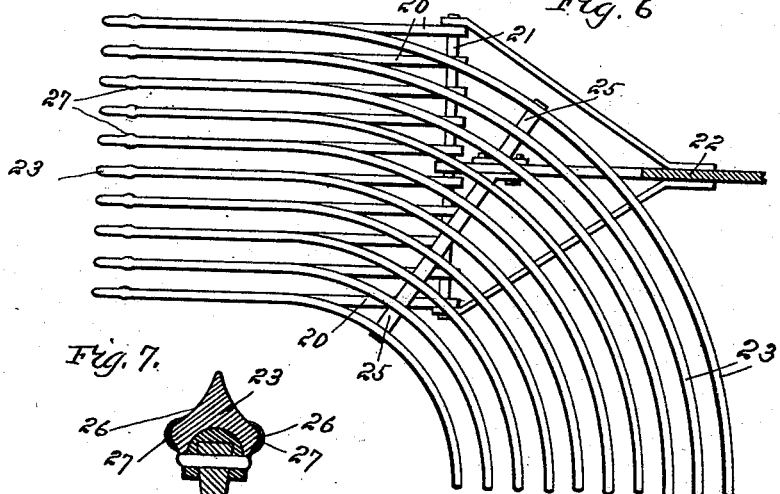
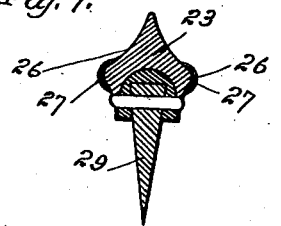

UNITED STATES PATENT OFFICE.

CORYDON S. NASH, OF NEWARK, NEW JERSEY.

POTATO-HARVESTER.

SPECIFICATION forming part of Letters Patent No. 648,466, dated May 1, 1900.

Application filed June 20, 1899. Serial No. 721,228. (No model.)

*To all whom it may concern:*

Be it known that I, CORYDON S. NASH, a citizen of the United States, residing at Newark, in the county of Essex, State of New Jersey, have invented certain new and useful Improvements in Potato-Harvesters, of which the following is a specification, reference being had therein to the accompanying drawings, in which—

Figure 1 is a side elevation of my machine; Fig. 1ª, a detail plan of a modified form of the uprooting-bar; Fig. 1ᵇ, a cross-section thereof on line $x\,x$; Fig. 1ᶜ, a transverse section on line $y\,y$ of Fig. 1ª; Fig. 1ᵈ, a detail view, on reduced scale, of the forward end of the machine, showing a modified arrangement of the steering and gage wheel; Fig. 2, a plan view of the machine; Fig. 3, a vertical section of the vine-pulling devices; Fig. 4, a transverse section on the line 4 4 of Fig. 3; Fig. 5, a detail plan of the forward ends of several of the inclined bars of the puller; Fig. 6, a plan view of the uprooting devices, the supporting-hanger being shown in section; and Fig. 7, a detail transverse section of one of the pressure-bars.

The object of the invention is to provide simple devices which will uproot the vines without disturbing the tubers and deliver the vines to one side, out of the way of the advancing machine, gathering devices being arranged behind the vine-puller to gather the buried potatoes and convey them to suitable devices which separate the soil and other foreign matter and deliver the cleansed potatoes into a sack or other receptacle ready for the market, whereby no manual handling of the crop is required to completely harvest it.

Referring to the drawings by numerals, 1 designates the main frame of the machine, which is preferably constructed of two longitudinal side beams connected by a suitable number of transverse beams and upon which is erected a suitable number of vertical posts 2 to support the boards composing the body or box. (Shown in dotted lines in Fig. 1.) The frame is supported about midway its length upon the transverse axle 3, which carries suitable transporting traction-wheels, and attached to the front of the frame is a suitable clevis or other device 4, to which is to be attached the draft-team. Between the main beams is supported an endless-screen elevator 5, which is supported at its lower forward end, below the main frame, as near to the surface of the ground as it is practicable, upon a roller 6 and at its upper rear end upon suitable sprocket-wheels 7, carried by shaft 8, journaled in the rear posts of the frame, said elevator being provided at its edges with suitable sprocket-chains engaging said sprocket 7 and suitable sprockets 9 at the ends of said roller 6. Said elevator is caused to travel upward and rearward by means of a sprocket-chain 10, connecting a sprocket-wheel 11, on the end of shaft 8, to a sprocket 12, carried by stub 13, journaled upon the side of the main frame and carrying a gear 14, meshing with a spur-gear 15, carried by the main axle, said elevator being thereby caused to travel continuously as the machine moves forward. The elevator is constructed of a suitable open-work material, so that the potatoes will be screened of dirt and stones and other debris as they are carried upward and rearward, and suitable transverse bars or strips 16 are fastened to the elevator at suitable intervals to carry up the potatoes, said bars or strips being constructed of wire or other open-work that will permit the passage of soil and stones, but will prevent the potatoes rolling down off the lower end of the elevator.

The machine is provided with two sets of vine-pulling and potato-gathering plows, one set being supported on either side of the machine, whereby it is adapted to harvest two rows of potatoes at once; but it is evident that a greater or less number may be employed without departing from the spirit of the invention. The vine-pulling devices are peculiar in that they serve to automatically pull up the vines without disturbing the potatoes, leaving the latter undisturbed in the earth to be scooped up with the adjacent earth and emptied into the screen elevator, the uprooted vines being dropped off to one side, out of the way of the scoop or plow. The scoop or plow consists simply of a channel or trough 17, suitably flanged and supported by arms 18 or otherwise at a suitable depth to scoop up all the potatoes in the hill and the surrounding earth, the forward lower edge being provided with sharpened cutting-fingers 19 to facilitate entrance into the earth, and the scoop is inclined upward and rearward, and its upper end bends inward to a point over the elevator, so that the scooped-up soil and tubers will be delivered to the elevator continuously as the machine moves forward.

The vine-puller consists, essentially, of a series of parallel substantially-horizontal bars 20, attached at their rear ends to a transverse rod 21, which is supported at the surface of the earth at a point in front of the scoop or plow by a hanger 22, depending from the forward end of the frame and projecting forward. The rod 21 is curved transversely, and the bars 20 are arranged on a similar transverse curve, so that they may run upon the curved surface of the hill, all the bars being in contact with the earth. The bars are substantially horizontal and are separated from each other a sufficient distance to receive between them the stems of the plants. Attached to the forward end of each bar or rod 20 is an upper rod 23, which inclines upward and rearward and curves to one side away from the main frame and the scoop. These inclined rods are parallel throughout their length and are supported at a suitable point by vertical rods 24, these rods being attached to brackets 25, carried by the hanger 22. The forward end of each inclined rod projects slightly in front of its companion horizontal rod and is rounded or dull-pointed in the manner of the finger of an ordinary cutter-bar, so that the stalks of the plants will not be mutilated, but will be directed into the spaces between the bars.

It will be observed that as the machine is drawn along the lower bars 20 will slide along on the surface of the hill and the stalks of the plants will enter the spaces between the bars. The bars should be so spaced that the stalks can only pass in between them by some compression upon their opposite sides at a point near the earth, this compressing action serving to bite or grasp the stalks and form notches or indentations of sufficient depth to serve as guides and compel the plants to pass up the inclined bars, the roots being pulled up from the earth through the pressure-bars 20. As each vine is uprooted and clears bars 20 it remains stationary until the next succeeding vine passes up the same or an adjacent channel and abuts against and forces it farther up, the succeeding vines being thereby caused to force the preceding vines upward and outward from between the bars, the vines falling to one side out of the way of the scoop. The rods are supported as rigidly as is possible; but it is evident that they will yield slightly laterally when the stalks pass in between them, thereby grasping the stalks with a slightly-yielding pressure, which will prevent a too great crushing action on the stalks, which would bruise or crush the stalks and render it difficult to uproot them. It will be observed that during the uprooting action the pressure-bars hold down the earth adjacent to the stalks and prevent the tubers being disturbed, this being feasible by reason of the comparatively-tender roots or tendrils connecting the tubers to the plant-root.

The lifting-rods 23 are each preferably angular in shape, as shown most clearly in Fig. 7, their rounded side edges 26 serving to groove or indent the plant-stalk, and to more positively groove or indent the stalk the side edges 26 are bulged or enlarged slightly near the points of the rod, so as to increase the depth of the indentation as the plant-stalks pass between the enlargements and before they begin to ascend. The forward ends of rods 20 are attached to the forward ends of rods 23 by being fastened in sockets in the under sides of said rods 23, as shown at 28 in Fig. 3. Each rod 20 is preferably provided on its under side with a knife 29, which fits and is secured in a groove in said rod, as shown in Fig. 7, and tapers forwardly, whereby any branches that may spring from the main stalks at points below the surface of the ground will be trimmed off as the machine proceeds.

The cleaned and screened potatoes are emptied by the elevator into a chute 30, which directs them into a bag 31, supported upon brackets 32, carried at the extreme rear end of the machine. The bag is further supported upon a platform 33, slidingly supported between the ends of the main beams, said sliding connection consisting of a suitable flange or rib 34, carried by the sides of the platform and working in suitable grooves formed in the inner sides of the main beams.

The apparatus may be steered by any suitable means. As shown in Figs. 1 and 2, a flanged guide-wheel 59 is supported in a fork 60, journaled in a vertical recess in the frame at the rear of the transporting-wheels, the upper ends of the fork being provided with an arm 61, projecting rearwardly and connected to cords 62, which run on pulleys to the forward part of the machine and are wound upon a vertical shaft 63, journaled upon the front of the machine near the driver's seat, whereby the driver may readily steer the machine without leaving his seat. If it be found that the preponderance of weight be in front of the axle, as is likely to be the case, the guide-wheel may be supported at a suitable point in front of the transporting-wheels, preferably at a point in front of the scoops and midway between the same, the guide-wheel being numbered 65 and the operating-shaft 64, as shown in Fig. 1$^d$. This latter steering device is preferable not only because it avoids the connecting-cords, but also because the wheel is made to serve as a gage to determine the depth at which the scoops shall run and also to prevent the vine-pulling devices from delving into the ground.

Instead of rounding or convexing the side edges of the uprooting-bars 23 they may be grooved along either edge, as shown at 58 in Figs. 1$^b$ and 1$^c$, whereby they will more certainly engage and form guide grooves or notches in the stalks without cutting or crushing the same. As is shown in Figs. 1ª and 1ᵇ, the bars 23 may be divided centrally to form two members 57, which will yield slightly, and thereby resiliently but firmly grasp the stalks.

It will be observed that my invention is not limited to the details of construction described and shown, and I therefore reserve the right to vary such construction without departing from the spirit of the claims or the invention.

Having thus fully described my invention, what I claim, and desire to secure by Letters Patent, is—

1. In a potato-digger, the combination of a transporting-frame, means for uprooting the vines as the machine advances, and a series of rods for continuously pressing on the earth adjacent to the vine being pulled, said rods carrying a series of knives tapering forward and projecting from the lower sides of the rods.

2. In a potato-digger, the combination of a transporting-frame, a vine-pulling device, and a series of rods adapted to press upon the earth progressively as the machine advances, said rods being arranged in a transverse curve so as to fit over the hill and slide along endwise on the earth.

3. In a potato-digger, the combination of a frame and devices for transporting it, a vine-uprooting device consisting of a series of upward-inclined bars adapted to engage and clasp the vines and lift them progressively, and means for pressing upon the earth adjacent to the vines progressively.

4. In a potato-harvester, the combination of a frame and devices for transporting it, a vine-puller consisting of a series of upward-projecting, separated bars adapted to press upon the earth progressively, and a series of upward-inclined bars connected to the forward ends of said pressure-bars, these inclined bars being separated and adapted to grasp and indent the vine-stalks, for the purpose set forth.

5. The combination of a frame and transporting means, a vine-puller carried thereby, consisting of a series of forward-projecting separated bars, a series of separated bars connected thereto at their forward ends and inclining upward and backward and curved laterally at their upper ends, and suitable supporting devices for the bars, for the purpose set forth.

6. In a potato-harvester, the combination of a frame carrying a vine-puller, said vine-puller consisting of two or more forward-projecting pressure-bars provided with longitudinal knives on their under sides, and devices for pulling the vines up between the pressure-bars as the machine advances, for the purpose set forth.

7. In a potato-harvester, the combination of a frame carrying a vine-puller consisting of devices for pressing upon the earth progressively as the machine advances and devices for uprooting the vines progressively, said latter devices consisting of separated upward-inclined rods whose adjacent faces are provided with projections or bulges 27, as and for the purposes set forth.

8. A tine for vine-pulling forks having a longitudinal groove formed in each of its side edges, substantially as and for the purpose set forth.

9. A tine for vine-pulling forks having a pointed head and being divided at the rear of said head to form two longitudinal yielding bars, for the purposes set forth.

In testimony whereof I hereunto affix my signature, in the presence of two witnesses, this 16th day of June, 1899.

CORYDON S. NASH.

Witnesses:
ROBERT SIMMONDS,
MYRON H. CLARK.